United States Patent [19]
Brainard, II et al.

[11] 3,906,790
[45] Sept. 23, 1975

[54] APPARATUS FOR MEASURING FLUIDIC CURRENT

[75] Inventors: Edward C. Brainard, II, Marion; John L. Layport, Mattapoisett, both of Mass.

[73] Assignee: Environmental Devices Corporation, Marion, Mass.

[22] Filed: Nov. 1, 1973

[21] Appl. No.: 411,646

[52] U.S. Cl. .............................................. 73/170 A
[51] Int. Cl.[2] ........................................ G01F 15/18
[58] Field of Search ........... 73/170 A, 185, 189; 9/8

[56] References Cited
UNITED STATES PATENTS

| | | | |
|---|---|---|---|
| 351,140 | 10/1886 | Walker | 73/185 |
| 384,362 | 6/1888 | Haskell | 73/189 |
| 1,022,385 | 4/1912 | Boccardo | 73/189 |
| 1,061,309 | 5/1913 | McQuown | 73/185 |
| 2,688,250 | 9/1954 | Roberts | 73/189 |
| 2,878,672 | 3/1959 | Wikkenhauser | 73/189 |
| 3,590,635 | 7/1971 | Duing | 73/170 |

*Primary Examiner*—Herbert Goldstein
*Attorney, Agent, or Firm*—Kenway & Jenney

[57] ABSTRACT

Fluidic current measuring apparatus has a current sensing unit of selected geometrical configuration, buoyancy and trim to maintain close alignment with a generally horizontal current being measured. Further, an attachment of the sensing unit to a mooring provides multi-axis freedom of motion for the unit to preserve the desired alignment in the presence of wave action and mooring motion. This attachment to a vertically extending mooring includes a swivel connection to the mooring, a horizontally extending arm fixed to the swivel connection, and a flexible tether suspending the sensing unit from the arm.

13 Claims, 3 Drawing Figures

APPARATUS FOR MEASURING FLUIDIC CURRENT

BACKGROUND

This invention relates to instrumentation for measuring the fluidic current in a body of water or like environment. In particular, the invention provides apparatus for deploying a fluidic current sensor from a cable or like mooring with optimal alignment of the sensor with the current being measured, even when the sensor is subjected to the dynamics of an immersed environment.

Instruments have long been available for immersion in a body of water to measure the fluidic current. However, this immersed environment is not static, but rather is dynamic due, aside from the current to be measured, to phenomena such as wave action, movement of the instrument mooring, and even changes in the water density. For example, wave action involves a circular and/or eliptical water motion with ensuing vertical and lateral displacements.

When for these or other reasons the current sensing element of a fluid meter is displaced from alignment with the current, the sensor measurement becomes erroneous. In an elementary instance, the sensor then responds to the cosine of the current, rather than directly to the current. However, the instrument generally cannot be fixedly installed, for it must be free to follow changes in the current direction.

In recognition of these and associated problems, prior current measuring apparatus has been constructed to secure the instrument to the mooring with tight, movement-restricting, coupling against several degrees of freedom. This arrangement can minimize movement of the instrument independently of the mooring. However, it subjects the instrument to whatever undesirable motion the mooring undergoes.

Another prior practice is to account for instrument misalignment, that is to measure the instrument movement due to forces other than the current being measured. For example, prior instruments of this character measure and record wave-responsive motion of the instrument. This additional data is then used to correct or otherwise adjust the measured values of current. This effort, however, requires additional instrumentation and requires additional processing of measured data. Also, in order to secure accurate data in this manner, measurements of both the fluidic current and the wave or other motion must be made more frequently than otherwise, and in particular there typically must be several readings made in each period of the wave motion. This increase in the fequency of measurement adds further cost, both in labor and in equipment.

Accordingly, it is an object of this invention to provide apparatus for measuring directly the fluidic current in a body of water or like environment with minimal error due to dynamics of the environment.

Another object of the invention is to provide apparatus for measuring the fluidic current in a body of water or like environment with maximal isolation from wave motion and from motion of the instrument mooring. It is also an object to provide such apparatus which is stable against changes in the density of the water or other liquid being monitored.

More particularly, it is an object of the invention to provide an aquatic current measuring instrument which maintains both an upright orientation and a close alignment with the current in spite of wave action, mooring motion and changes in water density.

A further object of the invention is to provide measuring apparatus of the above character which is relatively low in cost, which is efficient to operate, which involves minimal reduction of the measured data, and which is relatively easy to install at and remove from an underwater installation.

Other objects of the invention will in part be obvious and will in part appear hereinafter.

SUMMARY OF THE INVENTION

A fluidic current meter conventionally includes a sensing unit for exposure to and alignment with the current. The sensing unit records the velocity of the current, as well as the current direction.

A sensing unit of this type embodying the invention has a near neutral or small positive net buoyancy when immersed in the water or other liquid being monitored. Further, it has a center of buoyancy above and directly oppositely in line with the center of gravity when in the desired alignment with the current being measured.

A flexible tether suspends the sensing unit from a mooring so as to exert essentially no restraint on it other than tensile stress, which holds the sensing unit against movement along the direction of the current. Where the mooring is a vertically extending cable or like member, the tether connects to an arm which extends horizontally from a swivel clamp affixed to the cable. The clamp secures the instrument at a selected depth along the mooring cable. The arm extending from the swivel element of the clamp ensures that the tether does not wrap around the mooring, but rather that the swivel element and arm rotate about the mooring even at low current velocities. The tether isolates the sensing unit from mooring motion and allows the sensing unit to maintain the desired alignment with the current in spite of movement due to wave action. The tether preferably has a neutral buoyancy so that it does not interfere with the trim or attitude of the sensing unit. Further, the tether connects to the sensing unit through a roll-free bearing to diminish further any restraint on the sensing unit.

With this construction and arrangement, the instrument suspends in water at the desired depth in a horizontal attitude and remains aligned with the current of interest essentially without skew due to wave action or mooring motion. The resultant continuous orientation of the sensing unit with the current makes possible the direct measurement of the desired directional and velocity information regarding the current with minimal error. Further, the single attachment of the measuring instrument to the mooring, by way of the swivel clamp and tether, enables the instrument to be installed, and conversely removed, with comparative ease.

The invention accordingly comprises the features of construction, combination of elements, and arrangement of parts exemplified in the construction hereinafter set forth, and the scope of the invention is indicated in the claims.

BRIEF DESCRIPTION OF DRAWINGS

For a fuller understanding of the nature and objects of the invention, reference should be made to the following detailed description and the accompanying drawings, in which.

DESCRIPTION OF ILLUSTRATED EMBODIMENT

Figure 1:
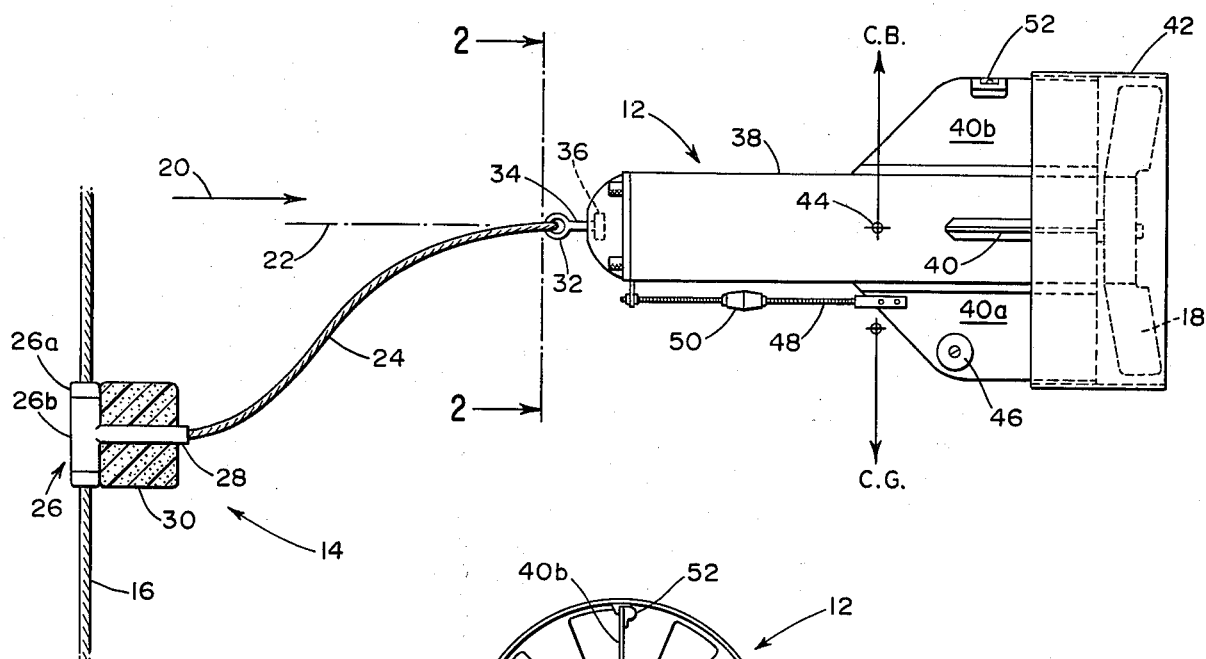
FIG. 1 is a side elevation view of an installed fluidic current meter embodying the invention.
Figure 2:
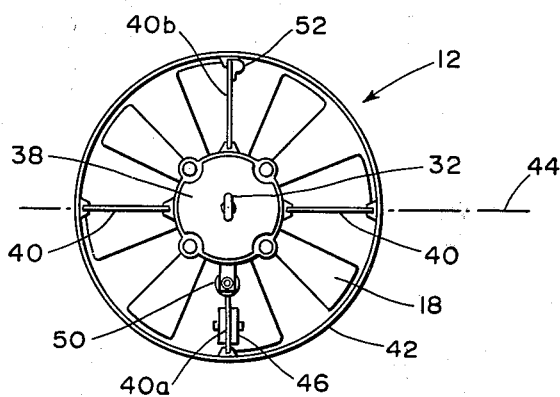
FIG. 2 is a front elevation view of the meter of FIG. 1 along line 2—2 thereof.

With reference to FIGS. 1 and 2, the illustrated current meter embodying the invention has a sensing unit 12 that mounts a current sensing impeller 18 for exposure to the current in a body of water. A deployment unit 14 of the meter suspends the sensing unit from a mooring cable 16 at a selected depth. The deployment unit allows the sensing unit to align with the current vector 20, and the current rotates the impeller 18 according to the current velocity. A compass within the sensing unit 12 identifies the current direction, and the impeller rotation is coupled to indicator means (not shown) to identify the current velocity. A clock-controlled camera or like recording means within the sensing unit records, generally continuously, the indicated values of current direction and velocity. This construction of a current meter with a current-driven impeller, compass, velocity indicator and recording means is known in the art and is commercially available. For example, the Instrument Division of Environmental Devices Corporation, Marion, Mass., markets current meter equipment constructed along these lines.

The further construction of the current meter in accordance with the invention is such that the recorded direction and velocity data have minimal errors due to misalignment or skewing of the sensing unit 12 from the current vector.

The meter sensing unit is symmetrical about a longitudinal axis 22 and is buoyed and trimmed to maintain a generally horizontal attitude, i.e., with axis 22 horizontal, and to maintain a selected upright orientation. Also, the sensing unit has a configuration for self-alignment of the axis with the current; the configuration preferably is streamlined, as shown. Further, the sensing unit 12 preferably has a net neutral buoyancy so that it streams at essentially the same depth as the attachment of the deployment unit to the mooring cable 16.

The deployment unit 14 includes a flexible tether 24 connected to the sensing unit, a swivel clamp 26 secured to the cable 16, and a rigid arm 28 extending from the clamp transversely to the cable and secured to the other end of the tether 24. The illustrated unit 14 further has a flotation collar 30 seated on the arm 28.

The swivel clamp 26 has a conventional construction with a generally tubular cable-engaging clamp member 26a having enlarged end hubs. A sleeve 26b is coaxially seated over the center portion of this member and is retained between the end hubs. The sleeve is free to rotate relative to the member 26a to provide a swivel action relative to the cable 16 and the member 26a secured thereto.

The arm 28 is fixedly secured to the sleeve and extends rigidly from it transverse to the cable, as illustrated. The tether 24 is secured to the distal end of the arm 28 and terminates at its other end with a ring or loop that is engaged by a further ring 32 mounted by way of a stem 34 to a bearing 36 secured within the nose of the sensing unit 12. The tether transmits tensile stresses between the sensing unit 12 and the cable 16 but is otherwise flexible. It can have either a negative buoyancy or a positive buoyancy as desired, but a neutral buoyancy is considered preferable.

The tether-connecting stem 34 is concentric with the longitudinal symmetry axis 22 so that the tether tension acts on the sensing unit along this axis 22, and so that rotation of stem 34 by virtue of bearing 36 is about this axis.

The floatation collar 30 has sufficient buoyancy to give the complete deployment unit 14 a net positive buoyancy so that if the unit should accidentally become disengaged from the cable 16, it will float to the water surface.

With continued reference to FIGS. 1 and 2, the illustrated sensing unit 12 is constructed with a streamlined, cylindrical, torpedo-like housing 38. As indicated, the tether-connecting bearing 36 is seated within the front or nose end of the housing. The housing carries current-aligning and stabilizing fins 40 along the rear or aft portion as illustrated; there preferably are four such fins equally spaced apart circumferentially. However, the illustrated sensing unit has vertically extending fins 40a and 40b of greater length than the lateral fins to reduce the fin area presented to vertical wave action. A cylindrical shroud 42 is affixed to the outer periphery of the fins at the stern end of the housing to protect the impeller 18 and to deflect weeds and the like from it. The shroud extends to the back (right in FIG. 1) beyond the impeller and its shaft so that the unit can be stored upright, standing on the shroud, without damage to the impeller and associated mechanism. As FIG. 1 indicates, the impeller 18 is mounted at the stern of the housing 38 for rotation about the axis 22 relative to the housing, fins and shroud.

The sensing unit housing 38 has a hollow tubular body which contains the instrumentation and recording elements noted above and also has sufficient air or other buoyant material sealed therein to endow the complete sensing unit with a net neutral or small positive buoyancy. In particular, a neutral buoyancy is desired, but a small, e.g., a few ounces, positive buoyancy is preferable to a negative value. Further, the sensing unit buoyancy is sufficient to enable the sensing unit, with the tether attached, to float to the surface in the event the tether becomes separated from the clamp and arm.

Further, the sensing unit center of buoyancy (C.B.) is substantially at the mid point of the sensing unit along the longitudinal axis 22. In addition, as FIG. 1 illustrates, when the sensing unit is oriented with the axis 22 thereof horizontal, its center of gravity (C.G.) is spaced substantially below both the axis 22 and the center of buoyancy, but is in line with the center of buoyancy. The reason the center of gravity is spaced below the center of buoyancy is to ensure that the sensing unit has a positive righting moment about the axis 22; that is, that it stably maintains the orientation shown in FIGS. 1 and 2. Similarly, the center of gravity is positioned in line with the center of buoyancy to minimize any tendency of the sensing unit to tilt about the lateral axis 44 (transverse to the axis 22 and to the plane of FIG. 1 and passing through the center of buoyancy).

To attain the above-noted ballast conditions with regard to buoyancy and center of gravity, a weight 46 is affixed to one fin 40a to impart a specified orientation to the housing wherein this fin is lowermost, as shown. The weight 46 preferably is proximal to the radial outermost edge of the fin 40a to maximize its effect in maintaining this orientation, i.e., to maximize the spacing of the center of gravity below the center of buoyancy. The fin 40a can be slotted in the direction parallel to axis 22 to allow the weight 46 to be positioned therealong, and thereby provide a course adjustment for the longitudinal position of the sensing unit center of gravity.

To provide fine adjustment of the location of the center of gravity along axis 22, a lead screw 48 threadably carrying a trim weight 50 is affixed to the housing. As shown, the lead screw extends parallel to the longitudinal axis 22, and is located below the housing in the plane of the lower fin 40a. The lead screw illustratively is suspended between the front edge of this fin and a support member adjacent the housing nose.

The weight 46 typically is secured in place prior to installation of the sensing unit, and the trim weight 50 can be adjusted to its approximate position at this time. However, as preferred, the trim weight 50 usually is finally positioned after the sensing unit is installed in the underwater location to be monitored. That is, to ensure that the sensing unit is suspended with its axis 22 horizontal — which in turn ensures that the center of buoyancy and the center of gravity are in-line as diagrammed in FIG. 1 — the trim weight 50 is threaded along the lead screw 48 to the proper position only after the instrument is buoyed at the liquid depth of measurement. To facilitate this adjustment, the illustrated sensing unit carries a spirit level 52; it is affixed adjacent the radial outer edge of the uppermost fin 40b.

The alignment of the center of buoyancy and center of gravity vectors eliminates a force couple that will otherwise result when these vectors are separated; and this force couple would result in the sensing unit being suspended with a tilt of the axis 22 from the horizontal. Such a tilt generally is undesirable. Of course, where it is desired to install the sensing unit with a selected pitch or tilt, the construction illustrated and described above is ideally suited, since the ballast trim weight 50 can be adjusted to attain this result, should it be desired. It will be noted that the sensing unit construction of this invention enables the tilt of the unit to be checked as needed after the unit is installed. Merely by checking the level 52 and adjusting the trim weight 50, a diver can maintain the instrument with the desired pitch, and even compensate for changes in water density.

Moreover, the sensing unit can be equipped with a servo system for automatically adjusting the trim weight continually or, as is more likely, periodically. Such an automatic trim-weight drive has a trim sensor which drives a trim-weight positioning motor to position the weight to minimize the sensed tilt error.

Figure 3:
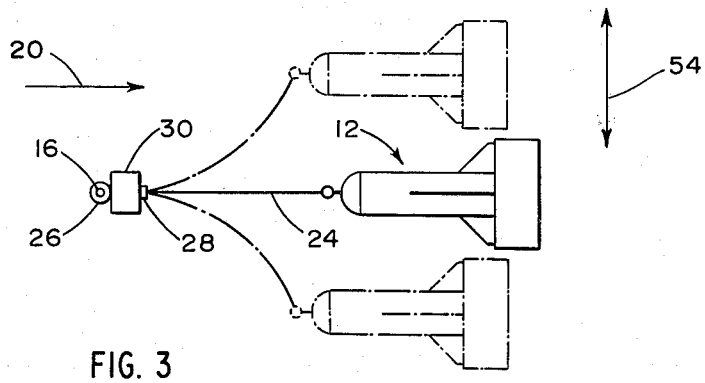
FIG. 3 is a top plan view of the meter of FIG. 1 and illustrating the meter response to wave action.

FIG. 3 illustrates, with the solid-line showing, that the sensing unit 12 described above generally trails behind the cable 16, in line with the current vector 20. As previously discussed, this in-line placement is desired for minimal-error measurement of the current velocity and direction directly, and without the need for correction for misalignment due to other forces. The near neutral buoyancy of the sensing unit and of the tether enhance alignment of the sensing unit with the current vector, particularly in the plane of FIG. 1. The roll-bearing connection of the tether to the housing, by bearing 36, avoids any torsional stress in the tether. Hence, the sensing unit is essentially unrestrained by the tether with regard to maintaining the roll attitude illustrated.

Moreover, the flexibility of the tether and of its ring-to-ring connection to the housing allows the sensing unit to follow wave action without significant skew relative to the current. For example, with reference to FIG. 3, horizontal wave action transverse to the current vector at the depth of measurement, i.e., along arrow 54, will move the sensing unit between the two positions shown with dashed lines, when the mooring does not move. This side-to-side movement of the sensing unit with the wave action — but with continued alignment with the current — does not detract from the current measurements.

FIG. 3 illustrates a condition where there is insufficient tension in the tether 24 to turn the swivel clamp 26. However, where the current velocity is stronger, or the wave action larger, the pull of the tether on the arm 28 readily rotates the clamp to turn the arm and thereby limit the amount of bending of the tether about the mooring cable.

The tether can be a rope of a blend of fibers selected to give it the desired buoyancy and flexibility.

The length of the tether 24 is selected to (i) provide sufficient length for isolating the sensing unit from mooring motion and (ii) restrict the sensing unit from departing from the point where current is to be measured. That is, a tether of undue length can allow the sensing unit to depart too far from the desired point of mooring. By way of example, for a sensing unit of one meter length (along axis 22) a tether of less than one-third meter length is generally undesirable as too short; a length of one to two meters, however, is considered preferable, although greater lengths (e.g., including nine meters) can be used. By way of specific further illustration, a one meter long sensing unit is deployed with a 1.5 meter tether which in turn is affixed to an arm 28 (FIG. 1) of 0.3 meter length.

It will thus be seen that the objects set forth above, among those made apparent from the preceding description, are efficiently attained. Since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. In apparatus for measuring the fluidic current in a body of water or like liquid environment and having a sensing unit for sensing the velocity and the direction of environmental fluidic current directed along a longitudinal axis of said unit, and which has a frontal suspension point and a finned configuration for the suspended alignment of said longitudinal axis thereof with the environmental current, the improvement comprising A. ballast means affixed to said sensing unit and providing said sensing unit with a net non-negative and near neutral buoyancy when in such liquid body and providing said sensing unit, when disposed with said longitudinal axis horizontal, with a center of buoyancy above and oppositely aligned with the center of gravity thereof, and B. deployment means connected along said longitudinal axis to said sensing unit at said suspension point, said deployment means allowing rotation of said sensing unit about a vertically extending axis and about said longitudinal axis and including tether means for exerting pull on said sensing unit along said longitudinal axis and for substantially isolating said sensing unit from motion, directed other than along said longitudinal axis, at the end of said tether means removed therefrom.

2. In apparatus as defined in claim 1, the further improvement wherein said ballast means includes A. a weight of selected mass for providing said buoyancy, and B. means for mounting said weight to said sensing unit below said longitudinal axis and for selective movement therealong.

3. In apparatus as defined in claim 1, the further improvement wherein said deployment means includes torsion-free coupling means connected with said tether means for accommodating with minimal restraint roll of said tether means about said longitudinal axis relative to said sensing unit.

4. In apparatus as defined in claim 1, the further improvement wherein

A. said deployment means includes a stiff arm member mounted for rotation about a vertical axis and extending horizontally therefrom, and B. said tether means comprises a flexible rope member secured to said arm member distal from the center of such rotation thereof and secured at the other end thereof to said suspension point of said sensing unit.

5. In apparatus as defined in claim 4 the further improvement wherein said flexible tether means has a length at least equal to that of said sensing unit along said longitudinal axis, and said arm member has a length between the center of such rotation thereof and said tether means significantly shorter than the length of said tether means.

B. fastening means connected to the other end of said tether and for attachment to such mooring member, said fastening means allowing rotation of said tether about such mooring member, and C. ballast means for providing said sensing unit, with said mooring-attached tether connected thereto, with a net non-negative and near neutral buoyancy in such liquid at the selected depth.

6. In apparatus as defined in claim 1, the further improvement wherein said tether means comprises a flexible rope member having a length in the same order of magnitude as the length of said sensing unit along said longitudinal axis.

7. In apparatus for measuring the fluidic current in bodies of water and like liquid environments when moored at a selected depth therein from a mooring member elongated in a generally vertical direction, said apparatus having a finned, current-aligning sensing unit carrying a current-driven impeller for exposure to such liquid for driven rotation by the current thereof about a first axis and relative to said unit, the improvement comprising A. a flexible tether secured at one end to said unit for transferring tension thereto parallel to said first axis and for isolating said one end thereof from movement at the other end thereof which is directed transverse to said first axis.

B. fastening means connected to to other end of said tether and for attachment to such mooring member, said fastening means allowing rotation of said tether about such mooring member, and C. ballast means for providing said sensing unit, with said mooring-attached tether connected thereto, with a net non-negative and near neutral bouyancy in such liquid at the selected depth.

8. In apparatus as defined in claim 7 the further improvement comprising sensing unit-mounted trim means for maintaining said unit with said tether connected thereto oriented in such liquid with said first axis substantially horizontal.

9. In apparatus as defined in claim 7 the further improvement comprising rotation-free coupling means interconnecting said tether with said sensing unit for accommodating restraint-free rotation therebetween about said first axis.

10. In apparatus as defined in claim 7 the further improvement wherein said flexible tether has substantially neutral buoyancy in such liquid for developing essentially nil vertical pull at the connection thereof with said sensing unit.

11. In apparatus as defined in claim 7 the further improvement in which said sensing unit mounts trim means providing said sensing unit with a center of gravity spaced below and oppositely in line with the center of buoyancy for the orientation thereof with said first axis horizontal.

12. In apparatus as defined in claim 7 the further improvement wherein said tether has a length at least as long as the length of said sensing unit along said first axis for minimizing the application of said sensing unit of non-tensile movement at the other end of said tether, and sufficiently short to maintain said sensing unit at a specified location of current measurement.

13. In apparatus as defined in claim 7, the further improvement wherein said fastening means comprises a rigid arm member connected between said tether and the attachment to such mooring member.

* * * * *

UNITED STATES PATENT AND TRADEMARK OFFICE
CERTIFICATE OF CORRECTION

PATENT NO. : 3,906,790
DATED : September 23, 1975
INVENTOR(S) : Edward C. Brainard, II and John L. Layport It is certified that error appears in the above-identified patent and that said Letters Patent are hereby corrected as shown below:

Column 7, delete lines 43 through 50 (paragraphs B and C).

Column 8, line 15, before "other" change "to" to --the--.

Signed and Sealed this

Thirteenth Day of July 1976

[SEAL]

Attest:

RUTH C. MASON
Attesting Officer

C. MARSHALL DANN
Commissioner of Patents and Trademarks